(12) United States Patent
Jeon et al.

(10) Patent No.: US 9,242,652 B2
(45) Date of Patent: Jan. 26, 2016

(54) APPARATUS AND METHOD FOR DETERMINING SHORT-TERM DRIVING TENDENCY OF DRIVER

(71) Applicants: Hyundai Motor Company, Seoul (KR); Kia Motors Corporation, Seoul (KR)

(72) Inventors: Byeong Wook Jeon, Seoul (KR); Dong Hoon Jeong, Osan-si (KR)

(73) Assignees: Kia Motors Corporation, Seoul (KR); Hyundai Motor Company, Seoul (KR)

( * ) Notice: Subject to any disclaimer, the term of this patent is extended or adjusted under 35 U.S.C. 154(b) by 11 days.

(21) Appl. No.: 14/135,465

(22) Filed: Dec. 19, 2013

(65) Prior Publication Data
US 2014/0371949 A1 Dec. 18, 2014

(30) Foreign Application Priority Data
Jun. 12, 2013 (KR) ........................ 10-2013-0067380

(51) Int. Cl.
| | |
|---|---|
| *F16H 59/00* | (2006.01) |
| *F16H 61/02* | (2006.01) |
| *G07C 5/00* | (2006.01) |
| *B60W 50/08* | (2012.01) |
| *B60W 50/10* | (2012.01) |
| *B60W 10/06* | (2006.01) |
| *B60W 10/11* | (2012.01) |
| *B60W 30/16* | (2012.01) |
| *B60W 30/182* | (2012.01) |
| *B60W 40/09* | (2012.01) |

(52) U.S. Cl.
CPC ............ *B60W 50/08* (2013.01); *B60W 10/06* (2013.01); *B60W 10/11* (2013.01); *B60W 30/16* (2013.01); *B60W 30/182* (2013.01); *B60W 40/09* (2013.01); *B60W 50/10* (2013.01); *B60W 2520/10* (2013.01); *B60W 2520/105* (2013.01); *B60W 2540/30* (2013.01); *B60W 2550/302* (2013.01); *B60W 2550/308* (2013.01); *B60W 2550/402* (2013.01); *F16H 61/0213* (2013.01); *F16H 2059/003* (2013.01); *G07C 5/00* (2013.01)

(58) Field of Classification Search
None
See application file for complete search history.

(56) References Cited

U.S. PATENT DOCUMENTS

| | | | | |
|---|---|---|---|---|
| 6,070,118 | A * | 5/2000 | Ohta ................. | B60K 31/0066 477/97 |
| 6,125,314 | A * | 9/2000 | Graf et al. ....................... | 701/53 |
| 6,216,068 | B1 * | 4/2001 | Gimmler et al. ................ | 701/36 |

(Continued)

FOREIGN PATENT DOCUMENTS

| | | |
|---|---|---|
| JP | 7-40763 A | 2/1995 |
| JP | 2007-186141 A | 7/2007 |

(Continued)

*Primary Examiner* — James Trammell
*Assistant Examiner* — Demetra Smith-Stewart
(74) *Attorney, Agent, or Firm* — Morgan, Lewis & Bockius LLP

(57) ABSTRACT

An apparatus and a method for determining a short-term driving tendency of a driver may include a data detector configured to detect an acceleration of a vehicle, a vehicle speed, and an inter-vehicle distance, and a controller configured to calculate a relative speed with respect to a forward vehicle from the vehicle speed and the inter-vehicle distance, extract fuzzy result values for the vehicle speed and the inter-vehicle distance, respectively, by setting a membership function that corresponds to each of the acceleration of the vehicle and the relative speed with respect to the forward vehicle, and determine the short-term driving tendency of the driver using the fuzzy result values.

16 Claims, 3 Drawing Sheets

(56) References Cited

U.S. PATENT DOCUMENTS

| | | | |
|---|---|---|---|
| 6,718,247 B1 * | 4/2004 | Graf et al. | 701/51 |
| 8,140,241 B2 * | 3/2012 | Takeda | B60W 30/16 701/70 |
| 8,880,290 B2 * | 11/2014 | Syed et al. | 701/36 |
| 2009/0234522 A1 * | 9/2009 | Desanzo | B61L 23/04 701/20 |
| 2011/0172864 A1 * | 7/2011 | Syed et al. | 701/22 |
| 2011/0187522 A1 * | 8/2011 | Filev et al. | 340/441 |
| 2013/0173128 A1 * | 7/2013 | Syed et al. | 701/70 |
| 2013/0173129 A1 * | 7/2013 | Syed et al. | 701/70 |

FOREIGN PATENT DOCUMENTS

| | | |
|---|---|---|
| JP | 4501966 B2 | 7/2010 |
| JP | 4781104 B2 | 9/2011 |
| JP | 2013-122441 A | 6/2013 |
| KR | 2002-0089920 A | 11/2002 |
| KR | 10-2009-0014551 A | 2/2009 |

* cited by examiner (a)

(b)

(c)

APPARATUS AND METHOD FOR DETERMINING SHORT-TERM DRIVING TENDENCY OF DRIVER

CROSS-REFERENCE TO RELATED APPLICATION

The present application claims priority of Korean Patent Application Number 10-2013-0067380 filed on Jun. 12, 2013, the entire contents of which application are incorporated herein for all purposes by this reference.

BACKGROUND OF INVENTION

1. Field of Invention

The present invention relates to an apparatus and a method for determining a short-term driving tendency of a driver, and more particularly, to an apparatus and a method for determining a short-term driving tendency of a driver from acceleration of a vehicle and a relative speed of the vehicle of the driver with respect to a forward vehicle.

2. Description of Related Art

Satisfaction of customers regarding running performance of a vehicle depends on how a vehicle runs and coincides with a driving tendency of the driver. While tendencies of the customers vary, however, performance characteristic of the vehicle is set to one performance characteristic in the same vehicle model. Therefore, reaction of the vehicle may not coincide with the tendency of the customer.

Accordingly, customers frequently make a complaint about the running performance of the vehicle. That is, when the driving tendency of the customer is recognized, and shift is controlled so that the vehicle responds suitably to the driving tendency of the customers, the satisfaction of the customers regarding running performance may be maximized.

Accordingly, a method of learning the driving tendency of the customer over a short period of time and controlling the shift in accordance with the learned driving tendency has been developed. The method of controlling the shift in accordance with the learned driving tendency is performed under an assumption that the driving tendencies of the drivers are uniform. However, since the tendency of the driver is not always uniform, and may be changed in accordance with changes such as the mood of the driver, sudden changes in driving intention, a road condition, or the like, there is a great difference between the learned driving tendency and an actual tendency of a driver in certain environments. Accordingly, in a case in which shift is controlled in accordance with the learned driving tendency, the actual driving will of the driver may not be reflected on the shift and the driver may dissatisfy with the driving performance.

As main parameters for determining an acceleration intention of the driver, an accelerator pedal opening degree (APS) and a change rate of an accelerator pedal opening degree (ΔAPS) were mainly used in the related art. However, even though a situation of manipulating the accelerator pedal is an important reference for determining the driver's acceleration intention, there is a limitation to express the overall driving intention of the driver. That is, in order to recognize the driving tendency in a situation of driving the vehicle instead of a situation of accelerating the vehicle, a more reasonable determination reference is required rather than the APS.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide an apparatus and a method for determining a short-term driving tendency of a driver, which may perform customized shift by accurately determining a short-term driving tendency of a driver for a short time (e.g., while a vehicle currently runs or during a predetermined time while the vehicle currently runs).

Various aspects of the present invention provide an apparatus for determining a short-term driving tendency of a driver, including: a data detector configured to detect an acceleration of a vehicle, a vehicle speed, and an inter-vehicle distance; and a controller configured to calculate a relative speed with respect to a forward vehicle from the vehicle speed and the inter-vehicle distance, extract fuzzy result values for the vehicle speed and the inter-vehicle distance, respectively, by setting a membership function that corresponds to each of the acceleration of the vehicle and the relative speed with respect to the forward vehicle, and determine the short-term driving tendency of the driver using the fuzzy result values.

Further, when it is determined from the fuzzy result values that the vehicle acceleration is equal to or lower than a predetermined reference acceleration, and the relative speed with respect to the forward vehicle is equal to or higher than a predetermined reference speed, the controller may determine that the short-term driving tendency is a first tendency. When it is determined from the fuzzy result values that the vehicle acceleration exceeds a predetermined reference acceleration, and the relative speed with respect to the forward vehicle is lower than a predetermined reference speed, the controller may determine that the short-term driving tendency is a second tendency.

In addition, when it is determined from the fuzzy result values that the acceleration of the vehicle is equal to or lower than a reference acceleration and the relative speed with respect to the forward vehicle is lower than a predetermined reference speed, or when it is determined from the fuzzy result values that the acceleration of the vehicle exceeds the reference acceleration, and the relative speed with respect to the forward vehicle is equal to or higher than the predetermined reference speed, the controller may determine that the short-term driving tendency is a third tendency.

The controller may calculate the acceleration of the vehicle by differentiating the vehicle speed. The data detector may include a vehicle speed sensor mounted to a wheel of the vehicle, and measure the vehicle speed using the vehicle speed sensor. Further, the data detector may include a GPS module that is capable of determining a position of the vehicle, and calculate the vehicle speed using a GPS signal received by the GPS module. In addition, the data detector may include an acceleration sensor mounted to the vehicle, and measure the acceleration of the vehicle using the acceleration sensor.

Various other aspects of the present invention provide a method for determining a short-term driving tendency of a driver, including: detecting an acceleration of a vehicle, a vehicle speed, and an inter-vehicle distance; calculating a relative speed with respect to a forward vehicle from the vehicle speed and the inter-vehicle distance; setting a membership function that corresponds to each of the acceleration of the vehicle and the relative speed with respect to the forward vehicle; extracting fuzzy result values for the vehicle speed and the inter-vehicle distance, respectively; and determining the short-term driving tendency of the driver using the fuzzy result values.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
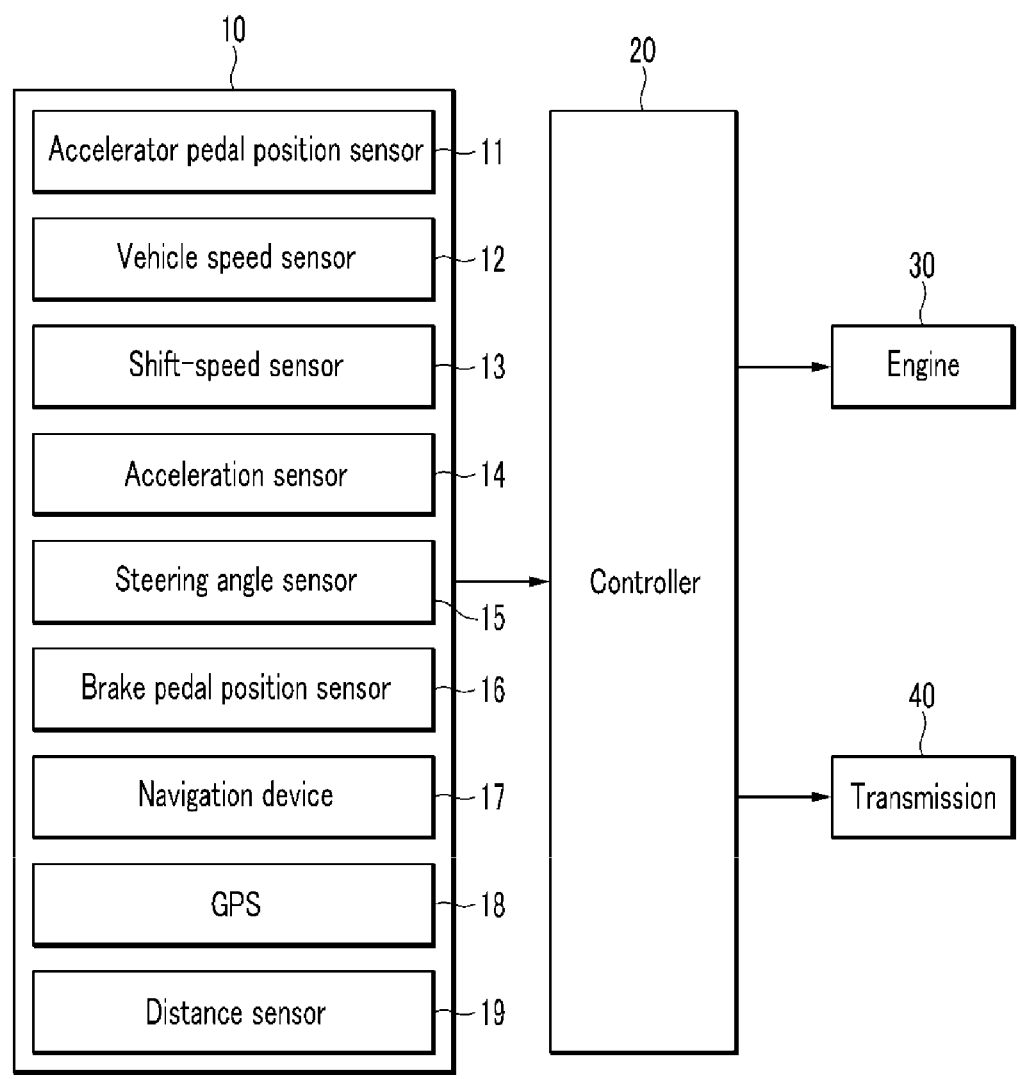
FIG. 1 is a block diagram of an exemplary apparatus for determining a short-term driving tendency of a driver according to the present invention.

FIG. 1 is a block diagram of an apparatus for determining a short-term driving tendency of a driver according to various embodiments of the present invention. As illustrated, an apparatus for determining a short-term driving tendency of a driver includes a data detector 10, a controller 20, an engine 30, and a transmission 40.

The data detector 10 detects the short-term driving tendency of the driver and data for determining the short-term driving tendency, and the data measured by the data detector 10 is transmitted to the controller 20. The data detector 10 includes an accelerator pedal position sensor 11, a vehicle speed sensor 12, a shift-speed sensor 13, an acceleration sensor 14, a steering angle sensor 15, a brake pedal position sensor 16, a navigation device 17, a global positioning system (GPS) 18, and a distance sensor 19.

The accelerator pedal position sensor 11 measures how much the driver presses an accelerator pedal. That is, the accelerator pedal position sensor 11 measures data regarding the driver's intention of accelerating a vehicle. The vehicle speed sensor 12 measures a vehicle speed, and is mounted to a wheel of the vehicle. In some cases, a vehicle speed may be calculated on the basis of a GPS signal received by the GPS 18.

Meanwhile, a target shift-speed may be calculated on the basis of a signal of the accelerator pedal position sensor 11 and a signal of the vehicle speed sensor 12 using a shift pattern, and shift to the target shift-speed is controlled. That is, in the case of an automatic transmission including a plurality of planetary gear sets and a plurality of friction elements, hydraulic pressure, which is supplied to the plurality of friction elements or released from the plurality of friction elements, is adjusted. In addition, in the case of a double clutch transmission, a current, which is applied to a plurality of synchronizer devices and actuators, is controlled.

The shift-speed sensor 13 detects a shift-speed that is currently engaged. The acceleration sensor 14 detects acceleration of the vehicle. In addition to the vehicle speed sensor 12, the acceleration sensor 14 is mounted to directly detect acceleration of the vehicle, or acceleration of the vehicle may be calculated by differentiating the vehicle speed detected by the vehicle speed sensor 12.

The steering angle sensor 15 detects a steering angle of the vehicle. That is, the steering angle sensor 15 detects a direction in which the vehicle intends to run. The brake pedal position sensor 16 detects whether the brake pedal is pressed or not. That is, the brake pedal position sensor 16 detects the driver's intention of accelerating the vehicle together with the accelerator pedal position sensor 11.

The navigation device 17 is a device that informs the driver of a path to a destination. The navigation device 17 includes an input and output unit configured to input and output information on a route guide, a current position detector configured to detect information on a current position of the vehicle, a memory storing map data, which is necessary to calculate a route, and data, which is necessary to guide the driver, a control unit configured to perform a route search or a route guide, and the like.

The GPS 18 receives an electric wave transmitted from a GPS satellite, and transmits a signal regarding the electric wave to the navigation device 17. The distance sensor 19 detects a distance between the vehicle of the driver and a forward or front vehicle, or a distance between the vehicle of the driver and a rear vehicle. As the distance sensor 19, various sensors such as an ultrasonic wave sensor or an infrared sensor may be used.

The controller 20 determines the short-term driving tendency of the driver on the basis of the data detected by the data detector 10. To this end, the controller 20 may be implemented to include at least one processor that is operated by a predetermined program, and the predetermined program may be programmed in order to perform each step of a method for determining the short-term driving tendency of the driver according to various embodiments of the present invention.

Specifically, the controller 20 determines the short-term driving tendency of the driver for a comparatively short time on the basis of the data detected by the data detector 10. That is, the controller 20 may determine a driving tendency of the driver, for example, while the vehicle currently runs or during a predetermined time while the vehicle currently runs. The short-term driving tendency of the driver may be determined on the basis of how well one or a plurality of assumptions regarding a tendency of the driver is satisfied, and a fuzzy control theory may be used to determine the short-term driving tendency of the driver.

The controller 20 applies the fuzzy control theory to a relative speed with respect to the forward vehicle and acceleration of the vehicle, and may set a membership function that corresponds each of the relative speed with respect to the forward vehicle and the acceleration of the vehicle. Further, the controller 20 may calculate a fuzzy result value from the membership function that corresponds to each of the relative speed with respect to the forward vehicle and the acceleration of the vehicle. In addition, the controller 20 may also determine the short-term driving tendency using a relative speed of the vehicle of the driver with respect to a vehicle that is not the forward vehicle. Hereinafter, a configuration in which the short-term driving tendency is determined using the relative speed with respect to the forward vehicle will be described.

When the controller 20 calculates a difference in speed between the forward vehicle and the vehicle of the driver using a distance between the vehicle of the driver and the forward vehicle, which is detected by the distance sensor 19, the calculated result may be defined as the relative speed of the vehicle of the driver with respect to the forward vehicle. That is, the relative speed with respect to the forward vehicle may be calculated by the following Equation 1.

$$VSPREL = V1 - V2 \qquad \text{Equation 1}$$

In Equation 1, VSPREL refers to a relative speed of the vehicle of the driver with respect to the forward vehicle, V1 refers to a speed of the forward vehicle, and V2 refers to a speed of the vehicle of the driver.

The membership function of the relative speed with respect to the forward vehicle may be separately defined as or divided into a defensive state against the forward vehicle when a value of VSPREL is a positive number, and an aggressive state against the forward vehicle when a value of VSPREL is a negative number.

In addition, the acceleration of the vehicle may be separately defined as or divided into a state in which the membership function of the acceleration of the vehicle is high, and a state in which the membership function of the acceleration of the vehicle is low, in accordance with the acceleration of the vehicle measured by the acceleration sensor 14 mounted separately from the vehicle speed sensor 12 or the acceleration of the vehicle calculated by differentiating the vehicle speed detected by the vehicle speed sensor 12.

Further, the controller 20 may determine the short-term driving tendency of the driver using the membership function set for the relative speed with respect to the forward vehicle and the acceleration of the vehicle.

Meanwhile, the controller 20 may determine a condition of a road on which the vehicle currently runs on the basis of the data detected by the data detector 10. The condition of the road includes a specific road state such as an icy road, a slippery road, a rough road, and an unpaved road, a specific road shape such as a curved road and a slope road, and a congested degree. In the case of the specific road state, the specific road shape, or the congested road, it is general that the vehicle is not driven in accordance with the driving tendency of the driver, but runs in accordance with the condition of the road. Therefore, the short-term driving tendency of the driver is not calculated under the specific road condition such that the driving tendency of the driver may be accurately calculated.

In some cases, the short-term driving tendency of the driver may be calculated even under the specific road condition. In such cases, a filter, which is strong against the short-term driving tendency of the driver calculated under the specific road condition, may be applied.

In addition, the controller 20 controls the engine 30 or the transmission 40 in accordance with a short-term driving tendency index of the driver. That is, the controller 20 may change a shift pattern, engagement feeling toward a target shift-speed, an engine torque map, and/or an engine torque filter in accordance with the short-term driving tendency index.

Figure 2:
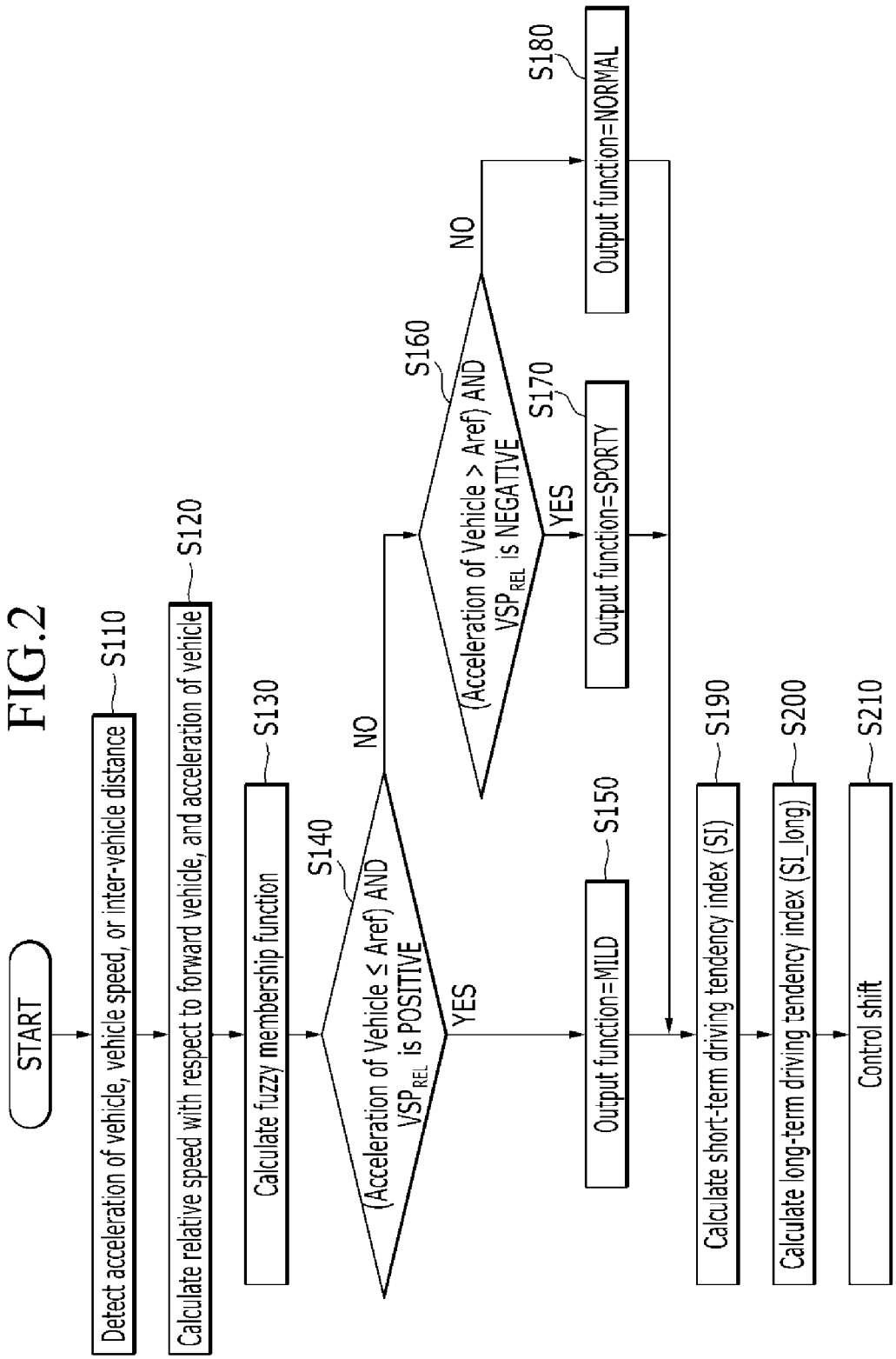
FIG. 2 is a flowchart of an exemplary method for determining a short-term driving tendency of a driver according to the present invention.
Figure 3:
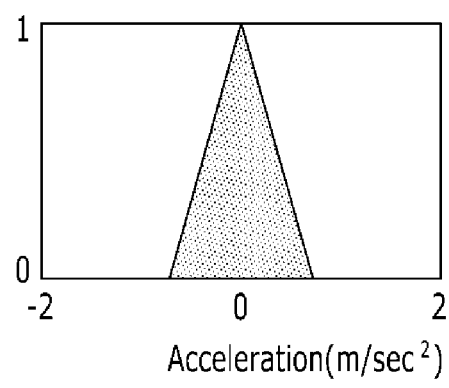
FIG. 3 is an exemplary view illustrating a membership function for determining a short-term driving tendency of a driver according to the present invention.
Figure 3:
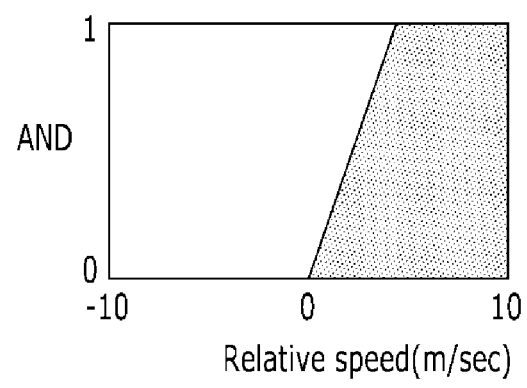
Figure 3:
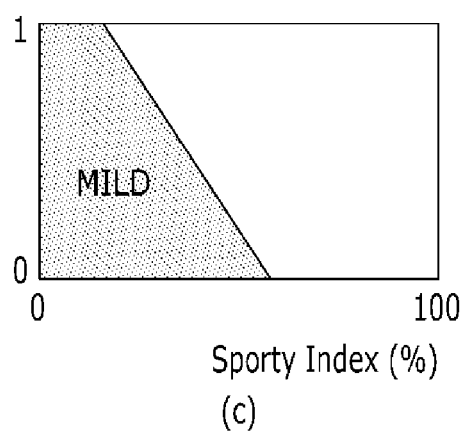

Hereinafter, a method for determining the short-term driving tendency of the driver will be described in detail with reference to FIGS. 2 and 3. FIG. 2 is a flowchart of a method for determining the short-term driving tendency of the driver and FIG. 3 is an exemplary view illustrating the membership function for determining the short-term driving tendency of the driver according to various embodiments of the present invention.

As illustrated in FIG. 2, the data detector 10 detects vehicle acceleration, a vehicle speed, or an inter-vehicle distance (S110). Specifically, the data detector 10 may measure the vehicle speed using the vehicle speed sensor 12 mounted to the wheel of the vehicle, or may detect the vehicle speed by calculating the vehicle speed on the basis of a GPS signal received by the GPS 18. Further, the data detector 10 may measure the acceleration of the vehicle using the acceleration sensor 14 mounted separately from the vehicle speed sensor 12. In addition, the data detector 10 may detect a distance between the vehicle of the driver and the forward vehicle using the distance sensor 19. Further, the data detector 10 may transmit the detected vehicle acceleration, vehicle speed, or inter-vehicle distance to the controller 20.

Next, after the data detector 10 detects the acceleration of the vehicle, the vehicle speed, or the inter-vehicle distance, and then transmits the acceleration of the vehicle, the vehicle speed, or the inter-vehicle distance to the controller 20, the controller 20 calculates the acceleration of the vehicle or the relative speed with respect to the forward vehicle (S120).

Specifically, in a case in which the vehicle speed and the inter-vehicle distance are detected by the data detector 10 and transmitted to the controller 20, the controller 20 may calculate the acceleration of the vehicle by differentiating the vehicle speed. Alternatively, in a case in which the acceleration of the vehicle is detected and transmitted from the data detector 10, the controller 20 may not perform the calculation of the acceleration of the vehicle.

Further, the controller 20 may calculate a speed of the forward vehicle using the vehicle speed and the inter-vehicle distance. In addition, the controller 20 may calculate the relative speed with respect to the forward vehicle by inputting the calculated speed of the forward vehicle and the calculated speed of the vehicle of the driver into Equation 1.

Next, the controller 20 calculates the membership function in which the relative speed with respect to the forward vehicle and the acceleration of the vehicle are used as variables (S130). The relative speed with respect to the forward vehicle and the acceleration of the vehicle, which are used as variables for calculation, may be values that are measured by the data detector 10 for a predetermined time and transmitted from the data detector 10, or values that are calculated by the controller 20 on the basis of the transmitted values.

The controller 20 determines whether the relative speed with respect to the forward vehicle is a positive number, and the acceleration of the vehicle is equal to or lower than a predetermined reference acceleration (S140). Further, when it is determined that the relative speed with respect to the forward vehicle is a positive number, and the acceleration of the vehicle is equal to or lower than the predetermined reference acceleration, the controller 20 determines that the short-term driving tendency of the driver is a first tendency (mild) (S150).

In step S140, if the relative speed with respect to the forward vehicle is a negative number, or the acceleration of the vehicle exceeds the predetermined reference acceleration, the controller 20 determines whether the relative speed with respect to the forward vehicle is a negative number, and the acceleration of the vehicle exceeds the predetermined reference acceleration (S160). Further, when it is determined that the relative speed with respect to the forward vehicle is a negative number, and the acceleration of the vehicle exceeds the predetermined reference acceleration, the controller 20 determines that the short-term driving tendency of the driver is a second tendency (sporty) (S170).

Finally, in step S160, if the relative speed with respect to the forward vehicle is a negative number, and the acceleration of the vehicle is equal to or lower than the predetermined reference acceleration, or if the relative speed with respect to the forward vehicle is a positive number, and the acceleration of the vehicle exceeds the predetermined reference acceleration, the controller 20 determines that the short-term driving tendency of the driver is a third tendency (normal) (S180).

Thereafter, the controller 20 calculates a short-term driving tendency index (SI) at each time point (S190). In addition, the controller 20 calculates and stores an average of the short-term driving tendency indexes for a predetermined time T1 as a short-term driving tendency index (SI_Avg) for a predetermined time. That is, the short-term driving tendency index (SI_Avg) for a predetermined time is calculated by the following Equation 2.

$$SI\_Avg = \frac{\sum_{t=t_0}^{t_0+T_1(sec)} SI}{T_1(sec)} \quad \text{Equation 2}$$

When the short-term driving tendency index for a predetermined time is calculated in step S190, the controller 20 calculates a long-term driving tendency index (SI_long) from recent n short-term driving tendency indexes using the following Equation 3 (S200).

$$SI\_long = \frac{\sum_{i=1}^{n} SI\_Avg_{n-i+1} \times W_i}{nT_1} \quad \text{Equation 3}$$

Here, SI_Avgi refers to an i-th short-term driving tendency index, and Wi refers to an i-th weight value. In addition, a sum of n weight values is 1, and the i-th weight value may be equal to or less than an (i+1)-th weight value. By allowing the (i+1)-th weight value to be equal to or greater than the i-th weight value, the most recent short-term driving tendency index most greatly influences the long-term driving tendency index.

While the present specification discloses one exemplary method of calculating the short-term driving tendency index and the long-term driving tendency index, it should be understood that the method of calculating the short-term driving tendency index and the long-term driving tendency index is not limited to the exemplary methods disclosed in the present specification.

When the long-term driving tendency index of the driver is calculated in step S200, the controller 20 controls shift in accordance with the long-term driving tendency index (S210). That is, the controller 20 changes the engine torque map and/or the engine torque filter in accordance with the long-term driving tendency index, and controls the engine 30 in accordance with the changed engine torque map and/or the changed engine torque filter. In addition, the controller 20 changes the shift pattern and the engagement feeling toward the target shift-speed in accordance with the long-term driving tendency index, and controls the transmission 40 in accordance with the changed shift pattern and the engagement feeling toward the target shift-speed.

Hereinafter, the membership function for the relative speed with respect to the forward vehicle and the acceleration of the vehicle will be described with reference to FIG. 3. FIG. 3 is an exemplary view illustrating the membership function for determining the short-term driving tendency of the driver according to various embodiments of the present invention.

In a case in which the vehicle speed does not rapidly increase or decrease, the controller 20 may express an input membership function in a state in which the acceleration of the vehicle is not varied, as illustrated in FIG. 3A. Further, when the relative speed with respect to the forward vehicle is a positive number, that is, a value calculated by Equation 1 is equal to or greater than 0, the controller 20 may express the inter-vehicle distance as an input membership function in a defensive state, as illustrated in FIG. 3B.

Further, as illustrated in FIG. 3C, the controller 20 may output a fuzzy result value using both the input membership functions. For example, when the input membership function is inputted, the controller 20 outputs the fuzzy result value as the third tendency (normal), and may determine that the short-term driving tendency of the driver is the third tendency.

As described above, according to various embodiments of the present invention, the short-term driving tendency of the driver is easily calculated from the relative speed of the vehicle of the driver with respect to the forward vehicle and the acceleration of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling operation of a vehicle, comprising:
    a data detector configured to detect data including an acceleration of the vehicle, a vehicle speed, and an inter-vehicle distance; and
    a controller configured to determine a relative speed with respect to a forward vehicle from the vehicle speed and the inter-vehicle distance, extract fuzzy result values for the vehicle speed and the inter-vehicle distance, respectively, by setting a membership function that corresponds to each of the acceleration of the vehicle and the relative speed with respect to the forward vehicle, and determine a short-term driving tendency of the driver using the fuzzy result values, and control an engine or shifting of a transmission based on the short-term driving tendency,
    wherein the controller does not determine the short-term driving tendency when the data shows that a condition of a road is a predetermined road state or road shape.

2. The apparatus of claim 1, wherein when it is determined from the fuzzy result values that the vehicle acceleration is equal to or lower than a predetermined reference acceleration, and the relative speed with respect to the forward vehicle is equal to or higher than a predetermined reference speed, the controller determines that the short-term driving tendency is a first tendency.

3. The apparatus of claim 1, wherein when it is determined from the fuzzy result values that the vehicle acceleration exceeds a predetermined reference acceleration, and the relative speed with respect to the forward vehicle is lower than a predetermined reference speed, the controller determines that the short-term driving tendency is a second tendency.

4. The apparatus of claim 1, wherein when it is determined from the fuzzy result values that the acceleration of the vehicle is equal to or lower than a reference acceleration and the relative speed with respect to the forward vehicle is lower than a predetermined reference speed, or when it is determined from the fuzzy result values that the acceleration of the vehicle exceeds the reference acceleration, and the relative speed with respect to the forward vehicle is equal to or higher than the predetermined reference speed, the controller determines that the short-term driving tendency is a third tendency.

5. The apparatus of claim 1, wherein the controller determines the acceleration of the vehicle by differentiating the vehicle speed.

6. The apparatus of claim 1, wherein the data detector includes a vehicle speed sensor mounted to a wheel of the vehicle, and measures the vehicle speed using the vehicle speed sensor.

7. The apparatus of claim 1, wherein the data detector includes a GPS module that is capable of determining a position of the vehicle, and determines the vehicle speed using a GPS signal received by the GPS module.

8. The apparatus of claim 1, wherein the data detector includes an acceleration sensor mounted to the vehicle, and measures the acceleration of the vehicle using the acceleration sensor.

9. A method for controlling operation of a vehicle, comprising:
   detecting, by a controller, acceleration of the vehicle, vehicle speed, and inter-vehicle distance;
   determining, by the controller, a relative speed with respect to a forward vehicle from the vehicle speed and the inter-vehicle distance;
   setting, by the controller, a membership function that corresponds to each of the acceleration of the vehicle and the relative speed with respect to the forward vehicle;
   extracting, by the controller, fuzzy result values for the vehicle speed and the inter-vehicle distance, respectively;
   determining, by the controller, a short-term driving tendency of the driver using the fuzzy result values; and
   controlling, by the controller, an engine or shifting of a transmission based on the short-term driving tendency.

10. The method of claim 9, wherein the determining of the short-term driving tendency of the driver includes:
    determining, by the controller, that the short-term driving tendency is a first tendency when it is determined from the fuzzy result values that the vehicle acceleration is equal to or lower than a predetermined reference acceleration, and the relative speed with respect to the forward vehicle is equal to or higher than a predetermined reference speed.

11. The method of claim 9, wherein the determining of the short-term driving tendency of the driver includes:
    determining, by the controller, that the short-term driving tendency is a second tendency when it is determined from the fuzzy result values that the vehicle acceleration exceeds a predetermined reference acceleration, and the relative speed with respect to the forward vehicle is lower than a predetermined reference speed.

12. The method of claim 9, wherein the determining of the short-term driving tendency of the driver includes:
    determining, by the controller, that the short-term driving tendency is a third tendency when it is determined from the fuzzy result values that the acceleration of the vehicle is equal to or lower than a predetermined reference acceleration and the relative speed with respect to the forward vehicle is lower than a predetermined reference speed, or when it is determined from the fuzzy result values that the acceleration of the vehicle exceeds the predetermined reference acceleration, and the relative speed with respect to the forward vehicle is equal to or higher than the predetermined reference speed.

13. The method of claim 9, wherein the acceleration of the vehicle is determined by differentiating the vehicle speed.

14. The method of claim 9, wherein the vehicle speed is measured using a vehicle speed sensor mounted to a wheel of the vehicle.

15. The method of claim 9, wherein the vehicle speed is determined using a GPS signal received by a GPS module that is capable of determining a position of the vehicle.

16. The method of claim 9, wherein the vehicle acceleration is measured using an acceleration sensor mounted to the vehicle.

* * * * *